(12) United States Patent
Dunlap

(10) Patent No.: US 7,223,335 B2
(45) Date of Patent: May 29, 2007

(54) ION SEPARATION

(76) Inventor: Henry R. Dunlap, Cairnwood Village, D-108, Bryn Athyn, PA (US) 19009

( * ) Notice: Subject to any disclaimer, the term of this patent is extended or adjusted under 35 U.S.C. 154(b) by 0 days.

(21) Appl. No.: 11/504,235

(22) Filed: Aug. 15, 2006

(65) Prior Publication Data
US 2007/0039862 A1    Feb. 22, 2007

Related U.S. Application Data

(60) Provisional application No. 60/708,457, filed on Aug. 16, 2005.

(51) Int. Cl.
*C02F 1/48* (2006.01)

(52) U.S. Cl. .............. 210/222; 422/186.01; 209/223.1; 209/227; 96/1

(58) Field of Classification Search .............. 210/222, 210/223, 695; 422/186.01; 209/223.1, 227; 96/1
See application file for complete search history.

(56) References Cited

U.S. PATENT DOCUMENTS

| | | | |
|---|---|---|---|
| 3,474,014 A | 10/1969 | Aul | 204/545 |
| 5,891,332 A | 4/1999 | Okamoto | 210/223 |
| 6,096,220 A * | 8/2000 | Ohkawa | 210/222 |
| 6,293,406 B1 * | 9/2001 | Miller et al. | 210/222 |
| 6,346,180 B1 | 2/2002 | Gonzalez et al. | 204/557 |
| 6,768,109 B1 | 7/2004 | Brokaw et al. | 250/298 |
| 6,783,687 B2 | 8/2004 | Richard | 210/695 |

* cited by examiner

*Primary Examiner*—David A. Reifsnyder
(74) *Attorney, Agent, or Firm*—Synnestvedt & Lechner LLP

(57) ABSTRACT

A device for separating ions from a fluid stream is disclosed. The device includes multiple chambers in fluid communication with one another. A first chamber has an inlet, and a last chamber has an outlet. The inlets and outlets of intermediate chambers are connected to one another so that fluid flows in a circular pattern through each chamber. A magnetic field extends through the chambers perpendicular to the flow. The magnetic field induces a force on the ions, moving ions of one polarity toward the center of the chambers and ions of the opposite polarity toward the periphery of the chambers. Each chamber has an outlet for drawing fluid from the chamber center. The circulation direction reverses in each chamber allowing both positive and negative ions to exit via the outlets. Fluid of reduced ion concentration exits the outlet channel.

23 Claims, 8 Drawing Sheets

ION SEPARATION

FIELD OF THE INVENTION

The invention is directed to devices for separating and removing ions from a fluid.

BACKGROUND OF THE INVENTION

Removal of ions from a fluid, such as occurs in the desalination of water, is commonly effected by evaporative techniques which require considerable energy. The water must be heated to steam, the steam drawn off and condensed. While such techniques may be acceptable for producing relatively small amounts of water, the large latent heat of vaporization of water renders such techniques impractical for desalinating large quantities of water, for example, for agricultural or industrial use.

Evaporative techniques are further impractical under conditions where significant amounts of fuel are unavailable, or it is impractical to generate the heat needed for desalination. For example, survivors from a shipwreck or a plane crash stranded on the ocean cannot normally boil water to steam and condense the steam on a raft. There is a need for an ion separation and removal device that operates more economically than evaporative techniques and is useable under primitive or adverse conditions.

SUMMARY OF THE INVENTION

The invention concerns a device for separating ions from a fluid. The device comprises a first chamber having a center region and a periphery. An inlet is positioned at the periphery so as to induce a substantially circular flow of fluid within the first chamber about an axis. A first outlet is positioned proximate to the center region so as to draw fluid from the center region. A second outlet is positioned at the periphery so as to draw fluid from the periphery. A magnetic field is aligned substantially along the first axis and passes through the first chamber. First ions in the fluid having a first polarity are forced toward the center region, and second ions having an opposite polarity are forced toward the periphery. The first outlet provides an exit from the chamber for the first ions, the second outlet provides an exit from the chamber for the second ions.

In another embodiment, the device for separating ions according to the invention comprises a first chamber, a plurality of intermediate chambers, and a last chamber. Each the chamber has a center region and a periphery. A respective inlet is positioned at the periphery of each of the chambers. The inlets are aligned so as to induce a substantially circular flow of the fluid about an axis in each of the chambers. The axes are substantially parallel to one another. A respective first outlet is positioned in each of the chambers proximate to the center regions thereof so as to draw fluid from the center regions. A respective second outlet is positioned in the periphery of each of the chambers so as to draw fluid from the periphery of each of the chambers, the second outlets of the first chamber and the intermediate chambers each being in fluid communication with a respective inlet of one of the intermediate chambers.

A magnetic field is aligned substantially along the axes and passes through the chambers. First ions in the fluid having a first polarity and circulating in a first direction are forced toward the center regions of the chambers, and second ions having an opposite polarity and circulating in the first direction are forced toward the peripheries. The first outlets provide an exit from the chambers for the first ions, the second outlets provide an exit from the chambers for the second ions. Furthermore, the first ions having the first polarity and circulating in a second direction opposite to the first direction are forced toward the peripheries of the chambers, and the second ions having the opposite polarity and circulating in the second direction are forced toward the center regions. The first outlets provide an exit from the chambers for the second ions, the second outlets provide an exit from the chambers for the first ions.

Another embodiment of an ion separator according to the invention comprises first and second chambers positioned adjacent to one another. An inlet is in fluid communication with both the first and second chambers. First and second outlet channels are in fluid communication with the first and second chambers at their respective peripheries. First and second outlets are positioned in fluid communication, respectively, with the first and second chambers substantially at their respective center regions.

A magnetic field is directed through the inlet and the chambers. The magnetic field exerts a force on ions flowing through the inlet, and directs ions having a first polarity into the first chamber and ions having a second polarity into the second chamber. A first portion of the fluid having a preponderance of ions having the first polarity exits the first chamber through the first outlet. A second portion of the fluid having a preponderance of ions having the second polarity exits the second chamber through the second central outlet. A remaining portion of the fluid having relatively fewer ions exits the first and second chambers through the first and second peripheral outlets.

Another embodiment of a device for separating ions from a fluid comprises an elongated conduit positioned substantially parallel and eccentric to an axis of rotation. An inlet is positioned at one end of the conduit. A first ion duct is positioned at an opposite end of the conduit and is in fluid communication with the conduit. A first exit port is in fluid communication with the first ion duct. A second ion duct is positioned at the opposite end of the conduit and is in fluid communication with the conduit. The second ion duct is positioned closer to the axis of rotation than the first ion duct. A second exit port is in fluid communication with the second ion duct. A neutral duct is positioned between the first and second ion ducts. The neutral duct is in fluid communication with the conduit. A third exit port is in fluid communication with the neutral duct. An inductor coil surrounds the conduit. The coil produces a magnetic field substantially parallel to the axis of rotation when an electrical current flows therethrough. Either the coil or the conduit or both are rotatable about the axis of rotation.

In operation, the fluid containing the ions enters the inlet and flows through the conduit. The magnetic field exerts a force on the ions in the fluid. Ions having one polarity are moved radially away from the axis of rotation, and ions having an opposite polarity are moved radially toward the axis of rotation. Ions having the one polarity enter the first ion duct and exit through the first exit port. Ions having the opposite polarity enter the second ion duct and exit through the second exit port. A remainder of the fluid from which the ions are separated enters the neutral duct and exits though the third exit port.

DETAILED DESCRIPTION OF THE EMBODIMENTS

Figure 1:
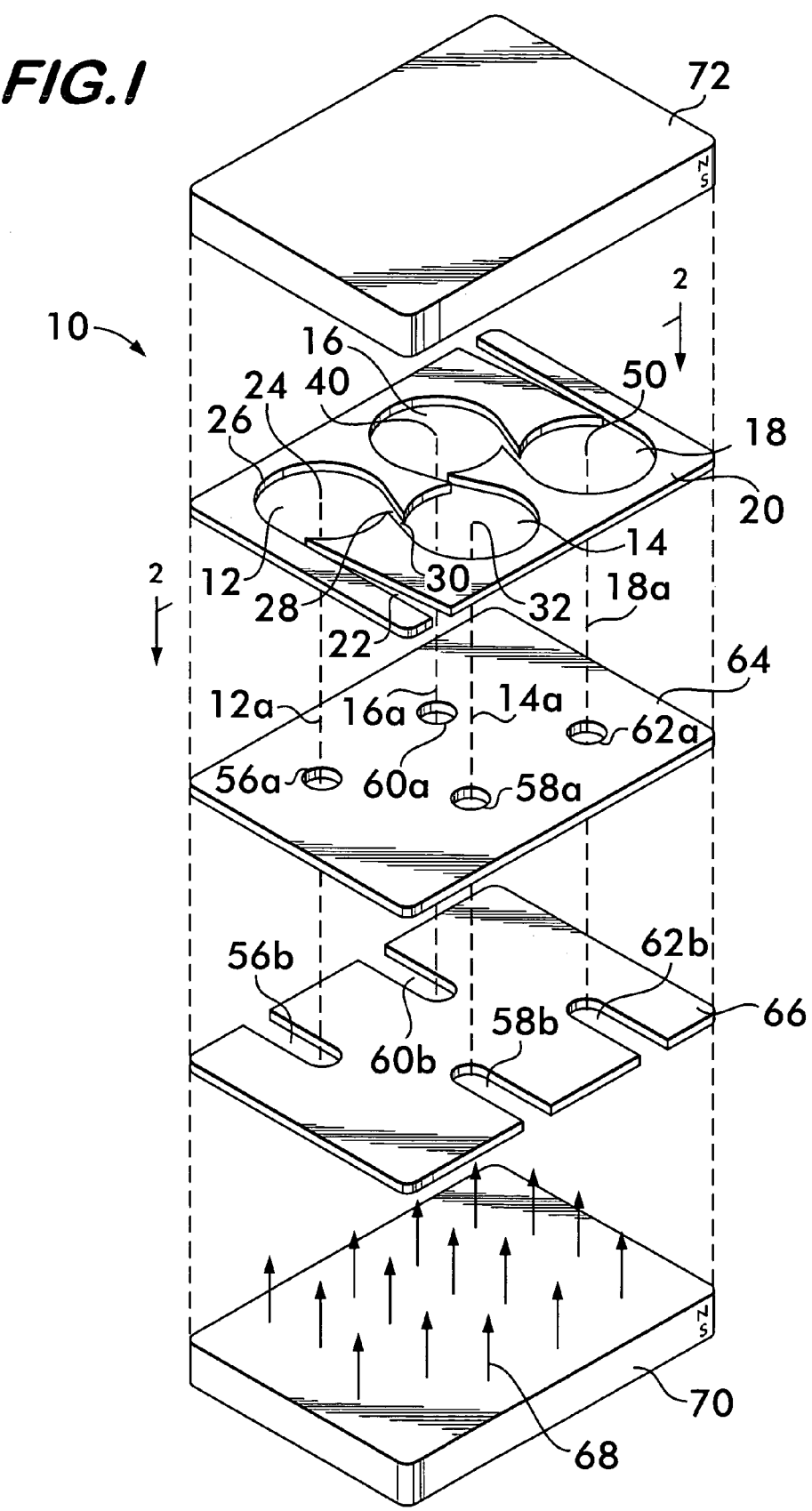
FIG. 1 is an exploded perspective view of an embodiment of a device for ion separation according to the invention.

FIG. 1 shows an exploded view of a device 10 for separating ions from a fluid. Device 10 comprises a plurality of chambers, four in this example, numbered 12, 14, 16 and 18. The chambers are defined by a plate 20 of non-magnetic material. Each chamber has an inlet and an outlet that intersect the chamber at its periphery. The inlet 22 of first chamber 12 comprises the inlet to the device 10 and is aligned offset from the center region 24 of the chamber 12 so as to induce a clockwise circular flow in fluid entering the chamber 12 about an axis 12a extending through the chamber. The chamber 12 also has a curved, preferably circular periphery 26 which further facilitates circular flow of fluid within it. The peripheral outlet 28 also intersects the chamber 12 at its periphery and is aligned offset from the center region so as to allow fluid near the periphery 26 to exit the chamber as described in detail below.

The outlet 28 of chamber 12 is in fluid communication with the inlet 30 of chamber 14. The inlet 30 is configured similarly to inlet 22 to induce a circular flow, this time counter clockwise in chamber 14. In this embodiment, this pattern is repeated, wherein the peripheral outlet of one chamber is in fluid communication with the inlet of the next chamber and arranged so as to induce a circular flow about a respective axis in each chamber, the flow circulating in opposite directions in adjacent chambers. Chambers 14 and 16 may be considered intermediate chambers and chamber 18 a last chamber whose outlet 54 provides an outlet from the device 10.

Each chamber also has a respective central outlet positioned proximate to the chamber center regions 24, 32, 40 and 50. The central outlets are defined by two plates 64 and 66 positioned below plate 20. Plate 64, positioned adjacent to plate 20, is used to define apertures 56a, 58a, 60a and 62a that are sized to draw fluid from the respective center region of each chamber. The apertures feed respective conduits 56b, 58b, 60b and 62b defined in the lowermost plate 66. The conduits allow fluid to exit the device 10. Plates 64 and 66 are also formed of non-magnetic material.

A magnetic field 68 extends through the chambers 12, 14, 16 and 18. The field is oriented so that it is substantially perpendicular to the fluid flow, i.e., substantially aligned with the axes 12a, 14a, 16a and 18a through each chamber. In this example, the magnetic field is provided by a pair of permanent magnets 70 and 72, magnet 72 overlying plate 20 and magnet 70 overlying plate 66. The north pole of magnet 70 faces the south pole of magnet 72, thereby orienting the field 68 upwardly through the chambers as depicted in FIG. 1. The plates 20, 64 and 66 and magnets 70 and 72 are sealingly joined to one another so that fluid flows only through the inlets, chambers and outlets as described below.

Operation of the device 10 is described with reference to FIG. 2. Ion bearing fluid 74 is conducted through inlet 22 to first chamber 12 where the fluid flows in a clockwise circulation within the chamber. Being charged particles moving in a magnetic field 68, the ions experience a force F described by the vector relation $F=qV \times B$ where q is the magnitude and polarity of the ions' charge, V is the ion velocity (direction and magnitude), and B is the magnetic field (strength and orientation). The vector operator "×" is the vector cross product.

Figure 2:
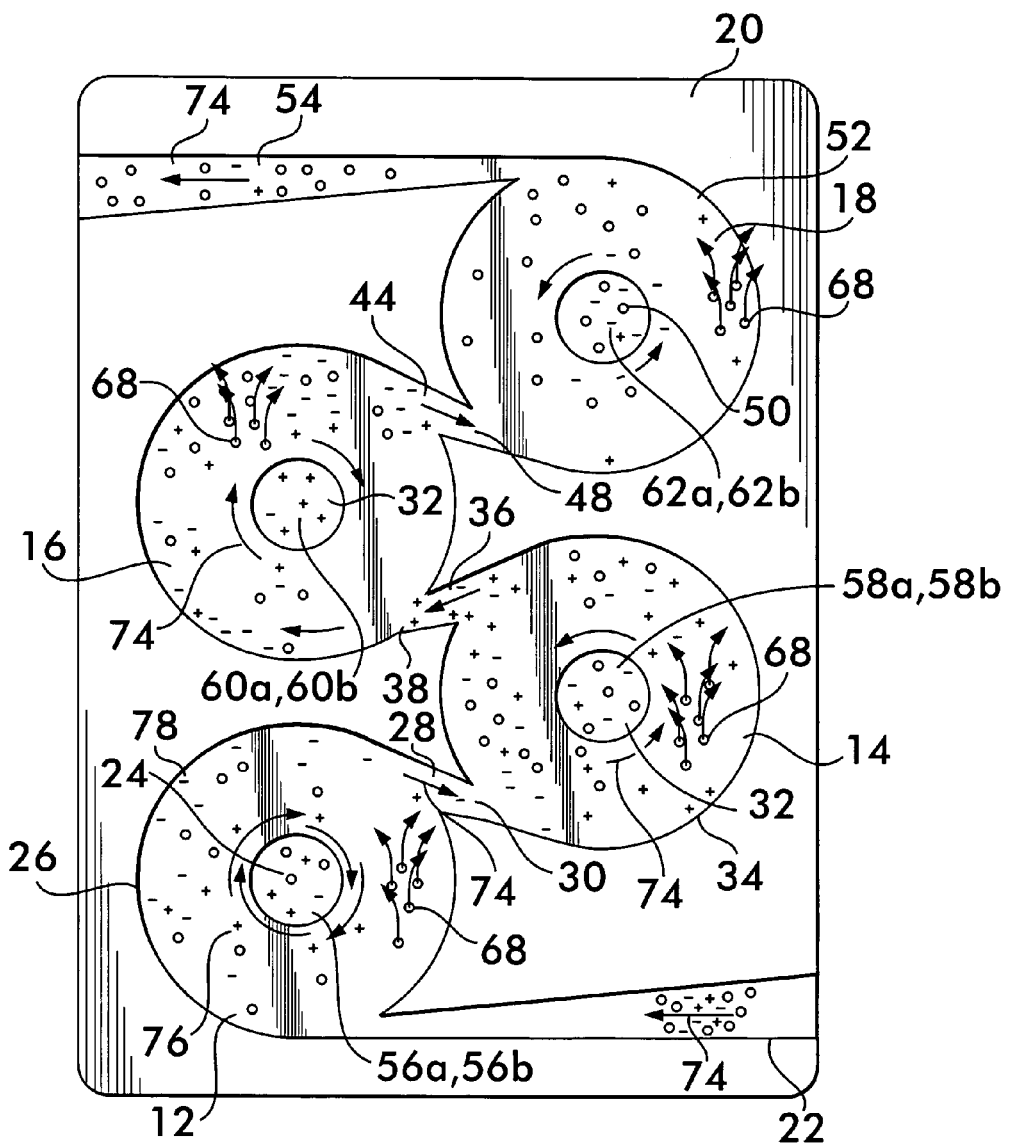
FIG. 2 is a sectional plan view taken at line 2—2 of FIG. 1.

Positive ions 76 moving in a clockwise circulation in chamber 12 through magnetic field 68 oriented out of the plane of FIG. 2 will experience a force F moving them inwardly toward the center region 24. Conversely, negative ions 78 in chamber 12 will experience a force −F, moving them toward the periphery 26. As a result of the magnetically induced force, the negative ions 78 will tend to exit chamber 12 through outlet 28, and the positive ions 76 will tend to exit the chamber through the outlet 56a, 56b located proximate to the center region 24. The portion of the fluid stream that exits the device through outlet 56a, 56b thus contains a higher concentration of positive ions. This portion may be sent to another ion separation device for further processing. The portion of the fluid stream that exits through outlet channel 28 contains a higher concentration of negative ions and enters intermediate chamber 14 through its inlet 30. Due to the position and orientation of inlet 30 at the periphery 34, the fluid stream 74 has a counter clockwise flow in chamber 14. The circulation of the flow in all of the chambers is enhanced by orienting the inlets offset from the center regions and giving the peripheries a curved, preferably circular shape.

The reversal of the ion velocity vector causes the forces on the ions to reverse so that positive ions in chamber 14 are moved toward the periphery 34 and negative ions toward the center region 32. A portion of the fluid stream having a higher concentration of negative ions exits the device through outlet 58a, 58b, while another portion of the stream having a higher concentration of positive ions exits chamber 14 through outlet 36. Outlet 36 is in fluid communication with inlet 38 of chamber 16. The circulation of the flow is again reversed, and moves clockwise in chamber 16, resulting in positive ions exiting the device through outlet 60a, 60b, and negative ions exiting chamber 16 through outlet 44.

As the fluid stream 74 passes through the various chambers, ions are separated at each stage so that the overall concentration of ions is significantly diminished by the time the stream enters the last chamber 18. The circulation of the flow in chamber 18 is again reversed from chamber 16 so negative ions are moved to the center region 50 where they exit through outlet 62a, 62b. Positive ions move to the periphery 52 and exit the device through outlet 54. The stream 74 that exits outlet channel 54 may have its ion concentration reduced to the desired level and be suitable for use, for example as irrigation or drinking water. If four stages of separation are not sufficient to reduce the ion concentration to an acceptable level, more stages could be added, for example, by adding more intermediate chambers or by operating several devices in cascade.

Figure 3:
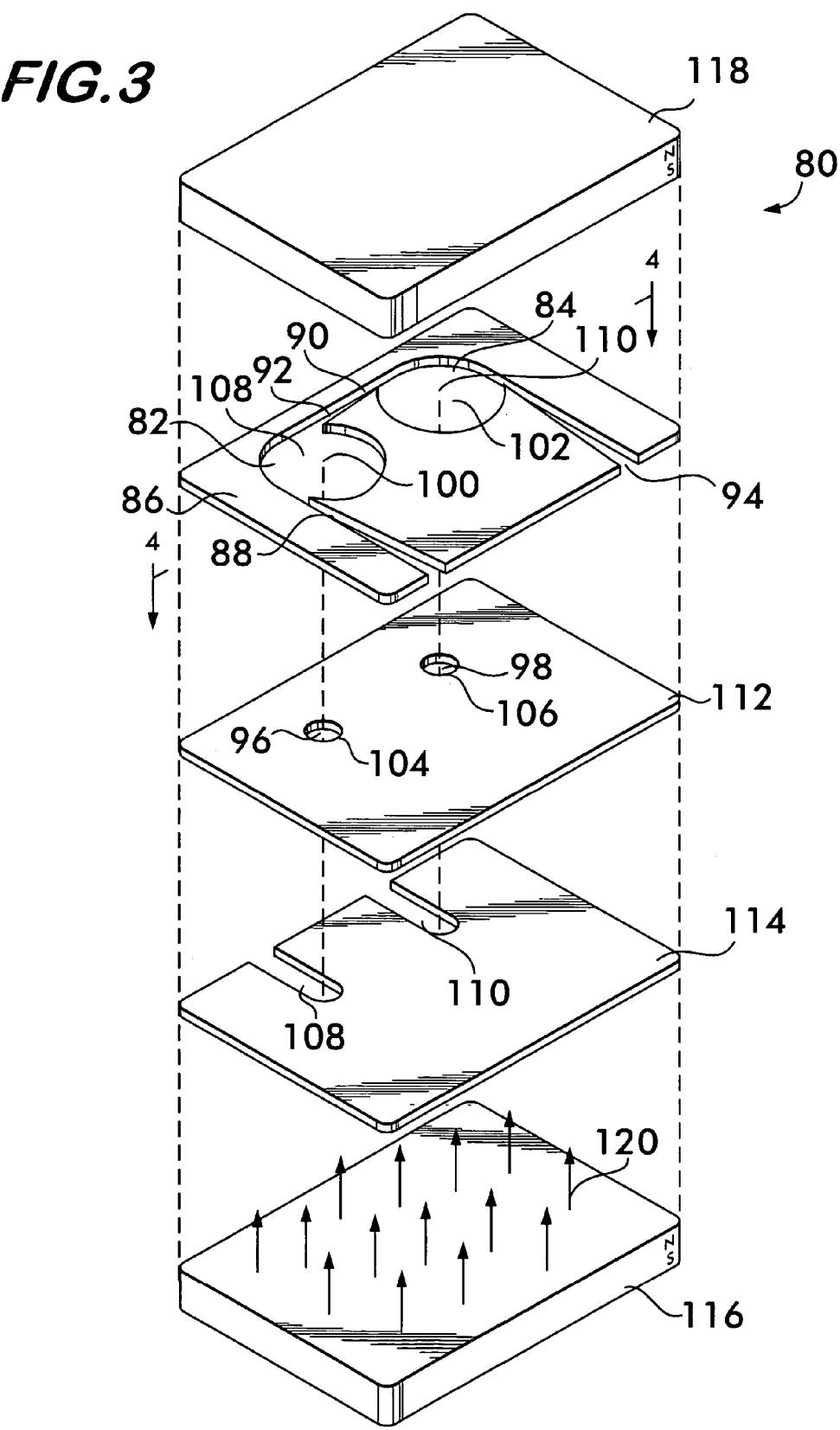
FIG. 3 is an exploded perspective view of another embodiment of a device for ion separation.
Figure 4:
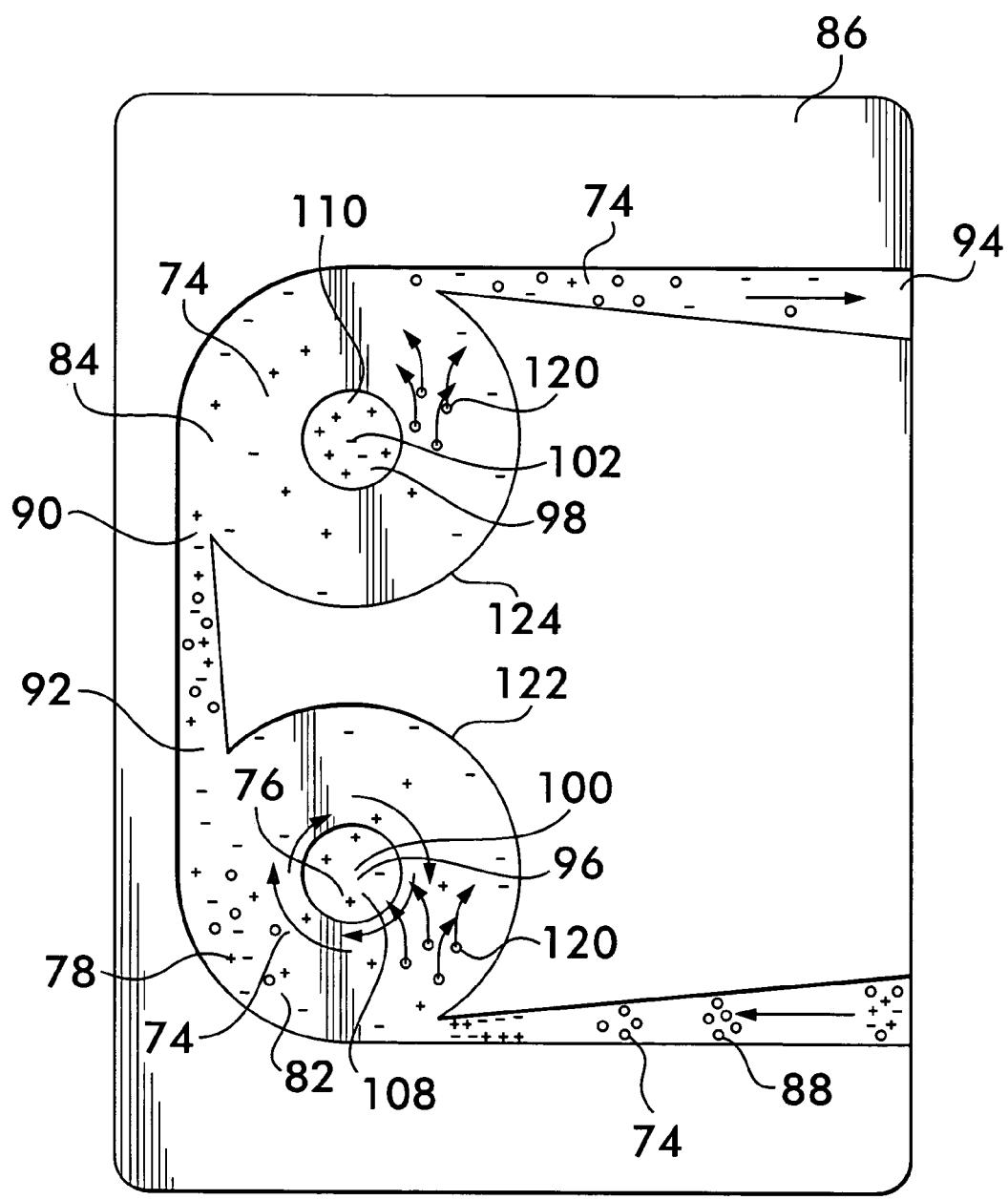
FIG. 4 is a sectional plan view taken at line 4—4 of FIG. 3.

FIG. 3 illustrates another embodiment 80 of a device for separating ions from a fluid stream. Device 80 comprises a plurality of chambers, in this example two chambers 82 and 84 defined by a plate 86. The chambers again have respective peripheral inlets 88 and 90 and peripheral outlets 92 and 94 also defined in plate 86. Outlet 92 of chamber 82 is in fluid communication with inlet 90 of chamber 84. Central outlets 96 and 98, positioned proximate to center regions 100 and 102, are defined by apertures 104 and 106 and conduits 108 and 110 in two overlying plates 112 and 114. The plates 86, 112 and 114 are again sandwiched between magnets 116 and 118 producing a magnetic field 120 through the chambers 82 and 84. In device 80, however, the circulation of the fluid flow 74 is in the same direction in both chambers. Thus, as shown in FIG. 4, for clockwise circulation and a magnetic field 120 out of the plane of the figure, negative ions 78 will tend to move outwardly toward the peripheries 122, 124 of each chamber and positive ions 76 will move toward the center regions 100 and 102. A portion of the fluid stream rich in positive ions exits the device from outlets 96 and 98, and other portions of the stream, rich in negative ions, exit through outlet 94. Device 80 may be used to further separate the ion streams by feeding the output streams from one device 80 into other similar devices in a cascade arrangement.

Figure 5:
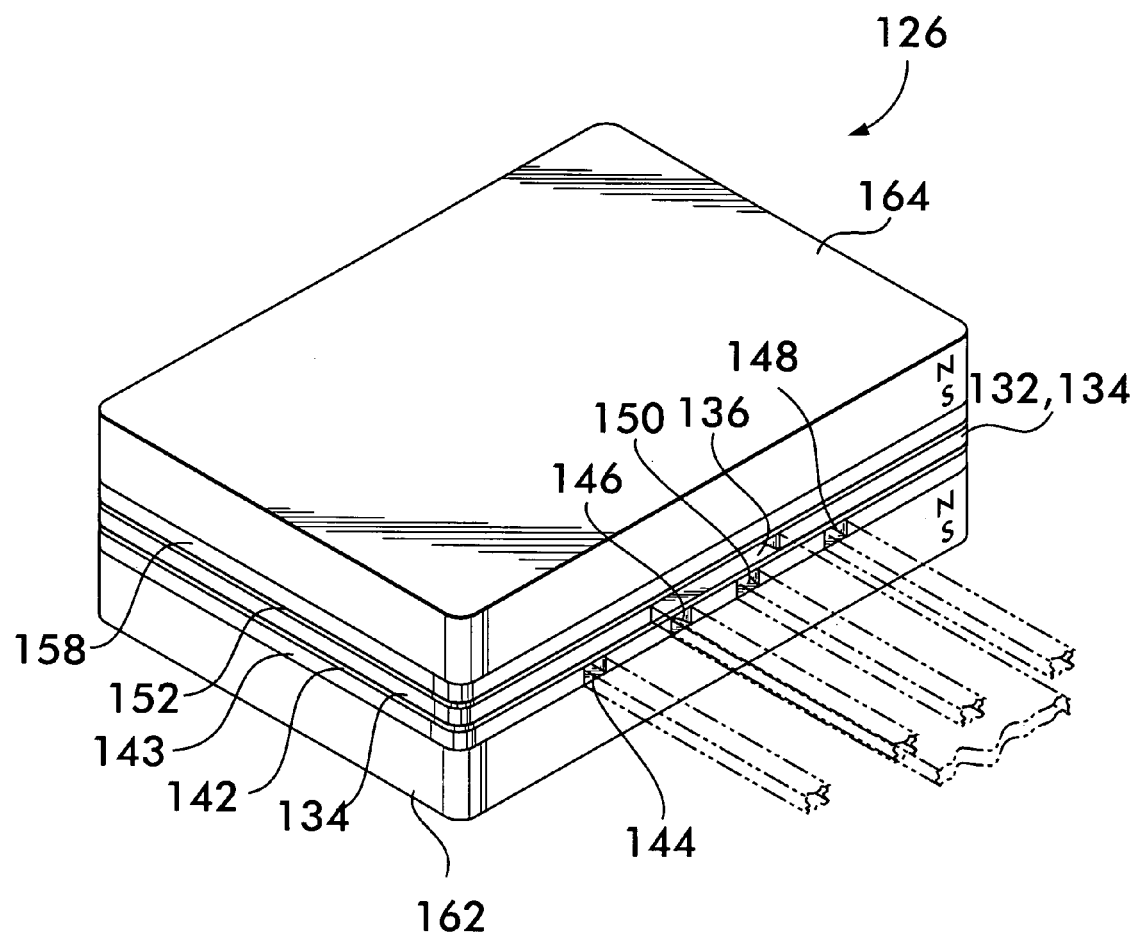
FIG. 5 is a perspective view of another embodiment of a device for ion separation.
Figure 6:
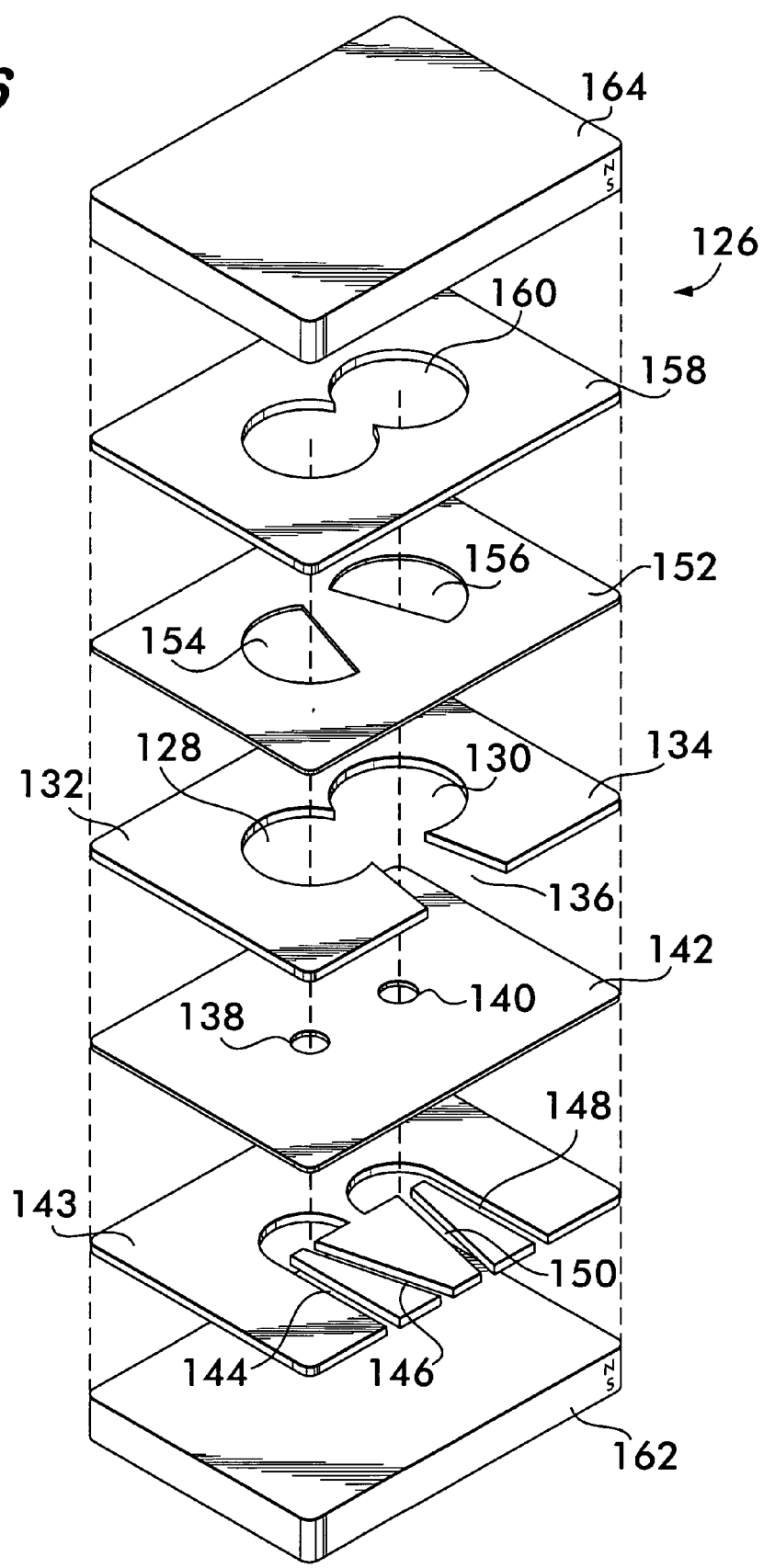
FIG. 6 is an exploded perspective view of the device shown in FIG. 5.

FIG. 5 shows a view of another embodiment of an ion separation device 126 according to the invention, and FIG. 6 shows an exploded view of that embodiment. Device 126 comprises two chambers 128 and 130, arranged side-by-side and defined by a plate 132. The chambers are positioned in substantially the same plane 134 and share a common inlet 136 through which fluid comprising ions in solution, for example, salt water, is supplied.

Flow of fluid from each chamber 128 and 130 is controlled by a respective orifice. Orifice 138 is associated with chamber 128, and orifice 140 is associated with chamber 130. The orifices are defined by a plate 142 positioned adjacent to the plate 132 defining chambers 128 and 130. Each orifice is in fluid communication with respective central and peripheral outlets defined in a plate 143. Fluid from chamber 128 is directed through orifice 138 and then may exit device 126 through either peripheral outlet 144 or central outlet 146 in plate 143. Fluid from chamber 130 is directed through orifice 140 and then may exit through peripheral outlet 148 or central outlet 150 in plate 143.

A divider plate 152 is positioned adjacent to plate 132 on an opposite side from plate 142. Divider plate 152 has openings 154 and 156 that respectively overlie chambers 128 and 130 and provide fluid communication to a bridge plate 158. Bridge plate 158 is positioned adjacent to the divider plate 152 and has a "FIG. 8" shaped opening 160 that provides fluid communication between chambers 128 and 130. The openings 154 and 156 in divider plate 152 control the flow of fluid between the chambers by virtue of their size and position relatively to the chambers. Note that the openings 154 and 156 are smaller than the chambers and are positioned outwardly away from the common inlet 136 to prevent mixing of the fluid at the inlet.

The chambers, orifices, outlets, divider and bridge plates are preferably sandwiched between permanent magnets 162 and 164 positioned on opposite sides of the device 126. Magnets 162 and 164 are arranged with opposite poles in facing relation so as to provide a magnetic field that is directed transversely, and preferably substantially perpendicularly to plane 134 in which the chambers reside. It is understood that the magnets 162 and 164 need not be permanent magnets, as electromagnets are also feasible.

In operation, liquid containing the ions in solution enters the device 126 through inlet 136. The ions, being charged particles moving preferably substantially perpendicularly to magnetic lines of flux extending transversely to plane 134, experience a force according to the formula $F=qV \times B$, where q is the ion's electrical charge, V is its velocity perpendicular to the magnetic field, B is the magnetic field strength, and "×" indicates a vector cross product operation as noted previously. The force on the particles acts perpendicular to both the direction of the magnetic field and the direction of particle motion perpendicular to the field and will direct the particles in curved paths into either chamber 128 or 130, depending upon the polarity of their charge. In this example, we assume the magnetic field is directed from magnet 162 to magnet 164. The direction of ion motion is toward the chambers through inlet 136. The vector cross product in this situation results in a force directing positively ions into chamber 130 and negatively charged ions into chamber 128.

The ions in chambers 128 and 130 swirl around in a vortex engendered by both the shape of the chambers and the continued effect of the magnetic field, which tends to drive the positive ions in chamber 130 clockwise and toward the center of the vortex in that chamber and the negative ions in chamber 128 counterclockwise and toward the center of the vortex in that chamber. The fluid stream then flows through orifices 138 and 140 and to the various outlets. Because of the relatively higher concentration of ions in the center of the vortices, fluid drawn off through central outlets 146 and 150 will tend to have higher concentrations of ions than the fluid drawn off through peripheral outlets 144 and 148, thereby effecting a separation of ions from the fluid. The fluid exiting through peripheral outlets 144 and 148 may be sent through multiple stages of ion separation in additional devices 126 in a cascading manner until the desired level of ion concentration is reached. Fluid drawn from central outlets 146 and 150 may be fed back into inlet 18 of device 10 or may be discarded.

It is recognized that, despite the magnetic force acting on the ions as they traverse inlet 136, some particles will enter the "wrong" chamber, i.e., some positive ions will enter chamber 128 and some negative ions will enter chamber 130. Ions circulating with the fluid in the "wrong" chamber will be directed by both the magnetic force and the centrifugal force of the vortex outwardly toward the periphery of the chambers. This will cause the ions to exit the chambers 128 and 130 through openings 154 and 156 in divider plate 152 and enter the figure 8 shaped opening 160 of bridge plate 158. Because the opening 160 is in fluid communication with both chambers 128 and 130, ions can travel between chambers. When an ion moves from the "wrong" chamber to the correct chamber, it is directed toward the center of the vortex by the magnetic field and exits the chamber through one of the peripheral or central outlets as described above.

Preferably, flow through the device has little or no turbulence to prevent mixing of the ions and allow their separation into the appropriate chamber by the interaction of the ions with the magnetic field. The lack of turbulence will also allow for higher concentrations of ions to be drawn off at the center outlets 146 and 150.

Figure 7:
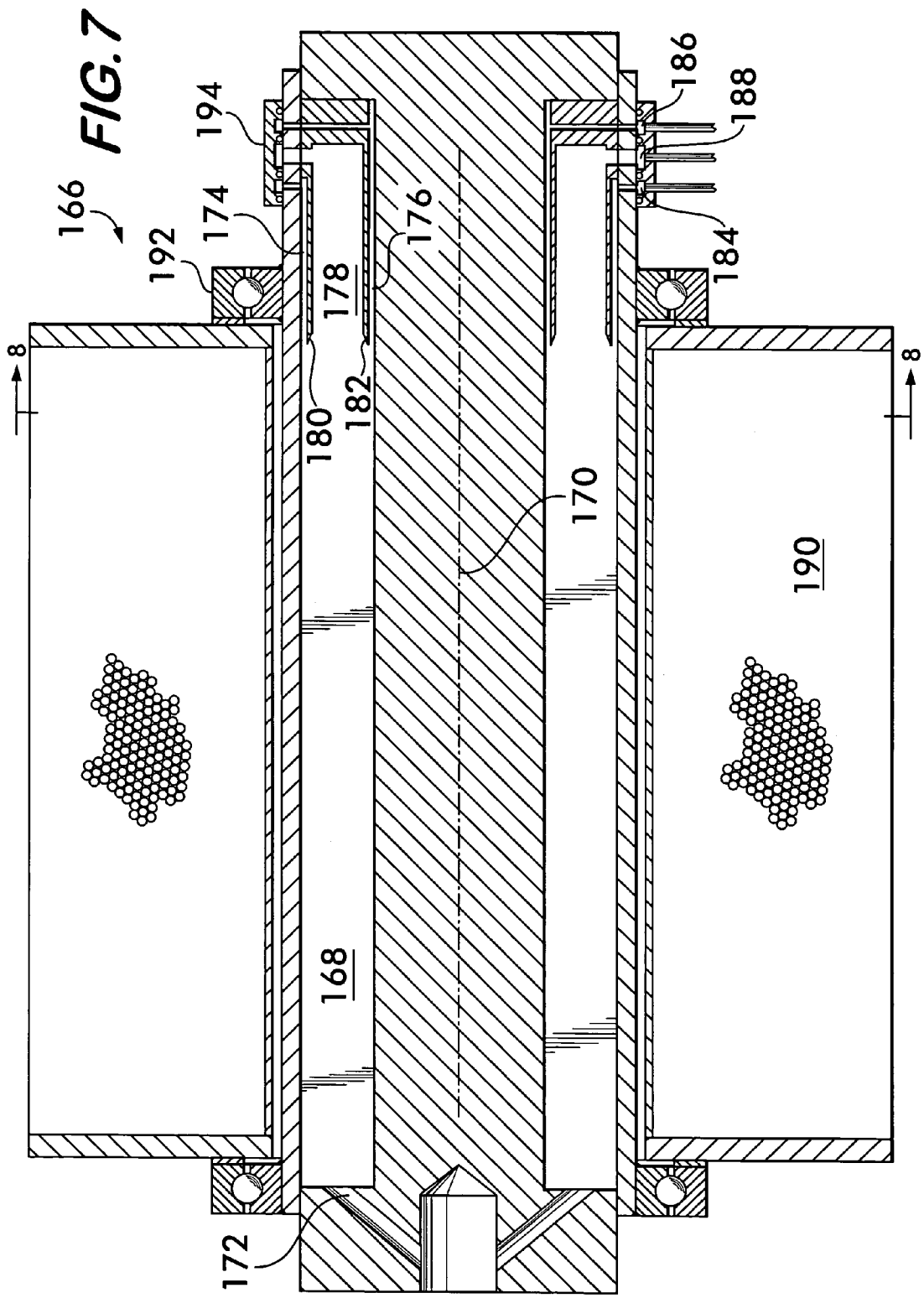
FIG. 7 is a longitudinal sectional view of another embodiment of a device for ion separation according to the invention.
Figure 8:
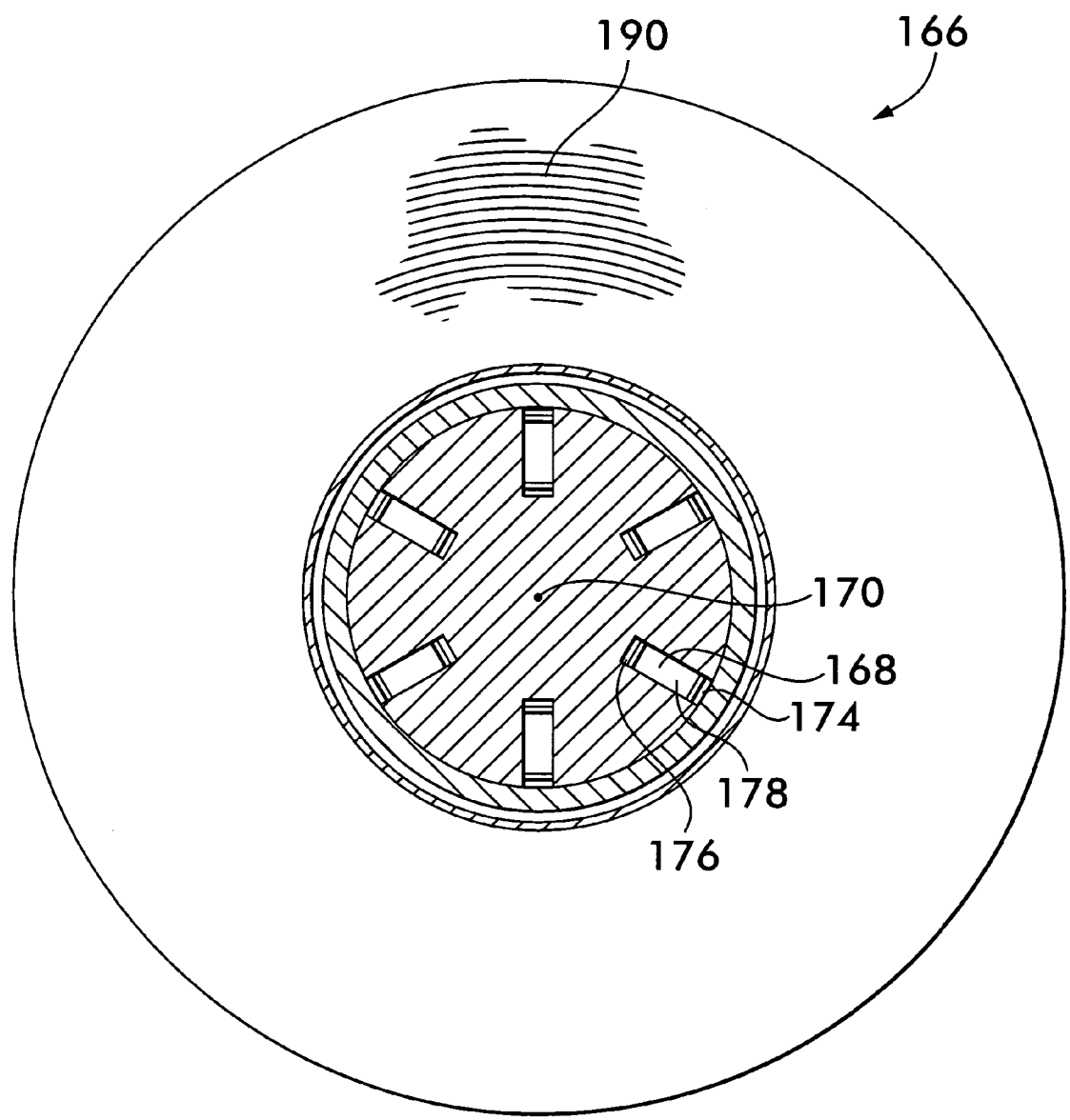
FIG. 8 is a cross-sectional view taken at line 8—8 of FIG. 7.

FIG. 7 shows another embodiment of a device 166 for separating ions from a fluid. Device 166 comprises one or more elongated conduits 168 that are positioned around and parallel to an axis of rotation 170. The conduits are eccentric to the axis for reasons described below. Each conduit 168 has an inlet 172 at one end. The opposite end of each conduit is in fluid communication with three ducts. A first ion duct 174 is positioned farthest from the axis of rotation 170; a second ion duct 176 is positioned closest to the axis of rotation, and a neutral duct 178 is positioned between the first and second ion ducts. FIG. 8 shows a cross sectional view that illustrates the preferred relative position of the ion and neutral ducts, positioned at different radial distances from the axis of rotation 170. In a preferred embodiment, the ducts 174, 176 and 178 are formed by dividing the opposite end of each conduit using interior walls 180 and 182 that extend lengthwise along the conduit.

Each duct is in fluid communication with a respective exit port. The first ion duct 174 is in communication with a first exit port 184, the second ion duct 176 is in communication with a second exit port 186, and the neutral duct 178 is in communication with a third exit port 188.

An inductor coil 190 is positioned surrounding the conduits 168. Preferably, the coil is centered on the axis of rotation 170. When energized, the coil produces a magnetic field that is oriented substantially parallel to the axis of rotation. Coil 190 is mounted on the channels by bearings 192 which permit relative rotation between the coil and the conduits. The device will operate if the coil is fixed and the conduits rotate, if the conduits are fixed and the coil rotates, or if both the conduits and the coil rotate, preferably in opposite directions. It is recognized that rotation of the conduits will require fittings such as 194 at the inlet and exit ports that provide for fluid communication between a stationary and a rotating component. Such fittings are known in the art and, therefore, not shown in detail herein. It is further recognized that rotation of the coil will require electrical connections that provide for electrical continuity between a stationary and rotating component. Such connections are also known and not shown in detail herein.

In operation, fluid containing ions in solution flows into inlets 172 and lengthwise through conduits 168. Coil 190 is charged, producing a magnetic field substantially parallel to axis of rotation 170. Relative rotation between the conduits 168 and the coil 190 moves the ions in the fluid transversely to the lines of magnetic flux, which are oriented lengthwise along the axis of rotation. The ions experience a force according to the formula F=qV×B, where q is the ion's electrical charge, V is its velocity perpendicular to the magnetic field, B is the magnetic field strength, and "×" indicates a vector cross product operation. The force on the particles acts perpendicularly to both the direction of the magnetic field and the direction of particle motion perpendicular to the magnetic field and will direct the particles either radially inwardly toward the axis 170, or radially outwardly away from the axis. The further the ions are from the axis of rotation the greater their speed perpendicular to the magnetic field, hence, it is advantageous to position conduits 168 eccentrically to the axis.

For the purposes of this example, it is assumed that the magnetic field is oriented from the inlet 168 toward the exit ports 184, 186 and 188, and that the conduits rotate counter clockwise relatively to the coil when viewed from the inlet end of device 166. Under these circumstances, the force on the ions will separate the fluid in each conduit into three substantially parallel streams, a first stream having a high concentration of positive ions positioned within the conduit closest to the axis of rotation, a second stream having a high concentration of negative ions within the conduit positioned farthest from the axis of rotation, and a stream having a low concentration of either type of ion substantially between the first and second streams. It is recognized that reversal of the direction of the magnetic field or the direction of relative rotation between the conduits and the coil will exchange the position of the positive and negative ions within the conduits.

As the fluid flows along the conduits 168, the ions become more concentrated in the first and second streams. It is advantageous that the flow through the conduits have little or no turbulence so as to prevent significant mixing between the streams. The first and second ion ducts and the neutral duct are positioned within each conduit so as to receive the three streams. The first ion duct 174 receives the stream having a high concentration of negative ions, the second ion duct 176 receives the stream having the high concentration of positive ions, and the neutral duct 178 receives the stream with the low ion concentration. The streams exit the ducts through the respective exit ports 184, 186 and 188. The streams from the first and second exit ports containing the high ion concentrations may be discarded and the stream from the third exit port 188, having the low ion concentration, can be fed to subsequent stages of separation performed in ion separators such as described herein until the desired level of ion concentration is achieved.

Ion separation devices as described herein provide for economically efficient separation of ions from a fluid without the need for high energy expenditure. The devices according to the invention are further portable and thought capable of effective operation under primitive conditions as would be encountered in the aftermath of a disaster.

What is claimed is:

1. A device for separating ions from a fluid, said device comprising:
    a first chamber having a center region and a periphery;
    an inlet positioned at said periphery so as to induce a substantially circular flow of fluid within said first chamber about an axis;
    a first outlet positioned proximate to said center region so as to draw fluid from said center region;
    a second outlet positioned at said periphery so as to draw fluid from said periphery; and
    a magnetic field aligned substantially along said axis of said first chamber and passing through said first chamber, wherein first ions in said fluid having a first polarity are forced toward said center region, and second ions having an opposite polarity are forced toward said periphery, said first outlet providing an exit from said chamber for said first ions, said second outlet providing an exit from said chamber for said second ions.

2. A device according to claim 1, further comprising:
    a second chamber having a center region and a periphery;
    an inlet for said second chamber in fluid communication with said second outlet of said first chamber, said inlet for said second chamber being positioned at said periphery of said second chamber so as to induce a substantially circular flow of fluid within said second chamber about an axis oriented substantially parallel to the axis of said first chamber, said substantially circular flow in said second chamber being in an opposite direction to said substantially circular flow in said first chamber;
    a first outlet positioned proximate to said center region of said second chamber so as to draw fluid from said center region of said second chamber;
    a second outlet positioned at said periphery of said second chamber so as to draw fluid from said periphery of said second chamber; and
    said magnetic field also being aligned substantially along said axis of said second chamber and also passing through said second chamber, wherein said first ions in said fluid are forced toward the periphery of said second chamber, and said second ions are forced toward the center region of said second chamber, said first outlet providing an exit from said second chamber for said second ions, said second outlet providing an exit from said second chamber for said first ions.

3. A device according to claim 2, further comprising:

a third chamber having a center region and a periphery;

an inlet for said third chamber in fluid communication with said second outlet of said second chamber, said inlet for said third chamber being positioned at said periphery of said third chamber so as to induce a substantially circular flow of fluid within said third chamber about an axis oriented substantially parallel to the axis of said first chamber, said substantially circular flow in said third chamber being in an opposite direction to said substantially circular flow in said second chamber;

a first outlet positioned proximate to said center region of said third chamber so as to draw fluid from said center region of said third chamber;

a second outlet positioned at said periphery of said third chamber so as to draw fluid from said periphery of said third chamber; and said magnetic field being aligned substantially along said axis of said third chamber and passing through said third chamber, wherein said first ions in said fluid are forced toward said center region of said third chamber, and said second ions are forced toward said periphery of said third chamber, said first outlet providing an exit from said third chamber for said first ions, said second outlet providing an exit from said third chamber for said second ions.

4. A device according to claim 3, further comprising:

a fourth chamber having a center region and a periphery;

an inlet for said fourth chamber in fluid communication with said second outlet of said third chamber, said inlet for said fourth chamber being positioned at said periphery of said fourth chamber so as to induce a substantially circular flow of fluid within said fourth chamber about an axis oriented substantially parallel to the axis of said first chamber, said substantially circular flow in said fourth chamber being in an opposite direction to said substantially circular flow in said third chamber;

a first outlet positioned proximate to said center region of said fourth chamber so as to draw fluid from said center region of said fourth chamber;

a second outlet positioned at said periphery of said fourth chamber so as to draw fluid from said periphery of said fourth chamber; and said magnetic field being aligned substantially along said axis of said fourth chamber and passing through said fourth chamber, wherein said first ions in said fluid are forced toward said periphery of said fourth chamber, and said second ions are forced toward said center region of said fourth chamber, said first outlet providing an exit from said fourth chamber for said second ions, said second outlet providing an exit from said fourth chamber for said first ions.

5. A device according to claim 1, wherein said periphery has a curved shape to facilitate said circular flow of said fluid.

6. A device according to claim 1, wherein said inlet is aligned offset from said center region.

7. A device according to claim 1, wherein said second outlet is aligned offset from said center region.

8. A device according to claim 1, further comprising:

a second chamber having a center region and a periphery;

an inlet for said second chamber in fluid communication with said second outlet of said first chamber, said inlet for said second chamber being positioned at said periphery of said second chamber so as to induce a second substantially circular flow of fluid within said second chamber about an axis oriented substantially parallel to the axis of said first chamber, said substantially circular flow in said second chamber being in substantially the same direction as said substantially circular flow in said first chamber;

a first outlet positioned proximate to said center region of said second chamber so as to draw fluid from said center region of said second chamber;

a second outlet positioned in said periphery of said second chamber so as to draw fluid from said periphery of said second chamber; and said magnetic field also being aligned substantially along said axis of said second chamber and also passing through said second chamber, wherein said first ions in said fluid are forced toward said center region of said second chamber, and said second ions are forced toward said periphery of said second chamber, said first outlet providing an exit from said second chamber for said first ions, said second outlet providing an exit from said second chamber for said second ions.

9. A device according to claim 1, further comprising a pair of magnets generating said magnetic field.

10. A device according to claim 9, wherein said magnets are permanent magnets.

11. A device for separating ions from a fluid, said device comprising:

a first chamber, a plurality of intermediate chambers and a last chamber, each said chamber having a center region and a periphery;

a respective inlet positioned at the periphery of each of said chambers, said inlets being aligned so as to induce a substantially circular flow of said fluid about an axis in each of said chambers, said axes being substantially parallel to one another;

a respective first outlet positioned in each of said chambers proximate to said center regions thereof so as to draw fluid from said center regions;

a respective second outlet positioned in the periphery of each of said chambers so as to draw fluid from said periphery of each of said chambers, said second outlets of said first chamber and said intermediate chambers each being in fluid communication with a respective inlet of one of said intermediate chambers; and a magnetic field aligned substantially along said axes and passing through said chambers, wherein first ions in said fluid having a first polarity and circulating in a first direction are forced toward said center regions of said chambers, and second ions having an opposite polarity and circulating in said first direction are forced toward said peripheries, said first outlets providing an exit from said chambers for said first ions, said second outlets providing an exit from said chambers for said second ions, and wherein said first ions having said first polarity and circulating in a second direction opposite to said first direction are forced toward said peripheries of said chambers, and said second ions having said opposite polarity and circulating in said second direction are forced toward said center regions, said first outlets providing an exit from said chambers for said second ions, said second outlets providing an exit from said chambers for said first ions.

12. A device according to claim 11, wherein all of said fluid flows circulate in the same direction.

13. A device according to claim 11, wherein said fluid flows in a first group of said chambers circulate in an opposite direction from said fluid flows in a second group of said chambers.

14. A device according to claim 11, wherein said inlets are arranged such that fluid flows in opposite directions in chambers that are in fluid communication with one another.

15. A device according to claim 11 comprising four of said chambers.

16. A device according to claim 11, wherein said inlets are aligned offset from said center regions so as to facilitate substantially circular flow in said chambers.

17. A device according to claim 11, wherein said second outlets are aligned offset from said center regions.

18. A device according to claim 11, wherein said chambers have a curved shape so as to facilitate substantially circular flow therein.

19. A device according to claim 11, further comprising a pair of magnets generating said magnetic field.

20. A device according to claim 19, wherein said magnets are permanent magnets.

21. A device for separating ions from a fluid, said device comprising:
first and second chambers positioned adjacent to one another;
an inlet in fluid communication with both said first and second chambers;
first and second outlet channels in fluid communication with said first and second chambers at their respective peripheries;
first and second outlets positioned in fluid communication respectively with said first and second chambers substantially at their respective center regions; and
a magnetic field directed through said inlet and said chambers, said magnetic field exerting a force on ions flowing through said inlet, and directing said ions having a first polarity into said first chamber, and directing ions having a second polarity into said second chamber, a first portion of said fluid having a preponderance of said ions having said first polarity exiting said first chamber through said first outlet, a second portion of said fluid having a preponderance of said ions having said second polarity exiting said second chamber through said second central outlet, a remaining portion of said fluid having relatively fewer ions exiting said first and second chambers through said first and second peripheral outlets.

22. A device according to claim 21, wherein said first and second chambers each have a curved periphery for facilitating circular flow within said chambers, said flows in each of said chambers circulating in opposite directions from one another.

23. A device according to claim 22, further comprising a third chamber overlying said first and second chambers and being in fluid communication therewith, said magnetic field passing through said third chamber and directing said ions having said first polarity and in said second chamber into said first chamber, said magnetic field further directing said ions having said second polarity and in said first chamber into said second chamber.

* * * * *